United States Patent Office 3,646,018
Patented Feb. 29, 1972

3,646,018
OXIDATIVE COUPLING AND DEHYDROGENA-
TION OF METHYL-SUBSTITUTED AROMATIC
AND HETEROCYCLIC COMPOUNDS
Roy B. Duke, Jr., and Larry M. Echelberger, Littleton,
Colo., assignors to Marathon Oil Company, Findlay,
Ohio
No Drawing. Filed May 27, 1969, Ser. No. 828,351
Int. Cl. C07c 3/10
U.S. Cl. 260—240 E                    35 Claims

ABSTRACT OF THE DISCLOSURE

Substituted aromatic and heterocyclic compounds, where at least one of the substituents is a methyl group (e.g. toluene) are contacted in the vapor phase with oxygen or an oxygen-containing gas and iodine, to form a reaction mixture. This reaction mixture is passed through a reactor containing a substantially inert contact surface, such as granular rocks and then over a catalytic mass containing a chromite at gas hourly space velocities of about 5 to 1500 hr.$^{-1}$ and at temperatures of from about 300° to 1300° F. to form the corresponding saturated and unsaturated coupled products (e.g. bibenzyl and stilbene).

CROSS REFERENCES TO RELATED APPLICATIONS

U.S. patent application Ser. No. 722,170, filed Apr. 18, 1968, and assigned to the assignee of the present invention, relates to the general field of the present invention and teaches a two-stage oxydehydrogenation process employing a copper chromite catalyst utilizable, for example, in the preparation of styrene from ethylbenzene.

BACKGROUND OF THE INVENTION

This invention relates to oxidative coupling and dehydrogenation of aromatic and heterocyclic compounds having at least one methyl group attached to the aromatic or heterocyclic ring. More particularly, this invention relates to a process for converting methyl-substituted aromatic and heterocyclic compounds to substituted ethanes and ethylenes.

U.S. Pats. 3,308,191, 3,308,196, and 3,308,200 to Bajars, teach the oxydehydrogenation of $C_4$ to $C_8$ hydrocarbons with a catalyst containing salts, oxides, or hydroxides of the alkali and alkaline metal earth elements and chromium, using chlorine, bromine, and iodine to promote the reactions.

U.S. Pats. 3,308,184, 3,308,194 to Bajars teach the oxydehydrogenation of $C_4$ to $C_8$ hydrocarbons with catalyst containing salts, oxides, or hydroxides of the alkali and alkaline metal earth elements and copper using the halogens, chlorine and bromine, to promote the reactions.

U.S. 3,205,280, to Watemena and Engel teaches the use of an oxydehydrogenation catalyst consisting of an alkali metal halide in combination with a silver halide and oxides of several metals including copper and chromium.

U.S. 3,409,680 to Hardesty et al. teaches a method for preparing trans-stilbene from toluene by an iodinative dehydrocoupling reaction in the presence of molten metallyic idode catalyst by maintaining a controlled conversion level between 10 and about 30 percent.

Our oxidative coupling and dehydrogenation invention differs from the prior art of such reactions in that it employs a catalyst containing a metallic chromite, such as copper chromite, barium chromite, iron chromite, etc., said chromites being conveniently prepared by thermally decomposing the corresponding metallic chromates, e.g. copper chromate, barium chromate, and iron chromate. In addition to the composition of the catalyst, our process differs from that disclosed in the prior art in that it takes advantage of the unique synergistic effects of a two-stage reaction as previously described in copending application Ser. No. 722,170.

SUMMARY OF THE INVENTION

We have found that the use of catalysts containing chromites, such as copper chromite, iron chromite barium chromite, and the like, are especially advantageous in promoting the oxidative coupling and dehydrogenation of methyl-substituted aromatic and heterocyclic compounds. It has also been found that conducting the coupling reaction in the presence of iodine using a two-stage process, as disclosed more fully in our copending application Ser. No. 722,170, and as taught more fully by comparing Examples 1, 11, and 12 of this application, is likewise advantageous.

One particular embodiment of this invention is the production of stilbene from toluene. Stilbene is used as a monomer or comonomer in various polymerization reactions. For example, stilbene has been copolymerized with butadiene, styrene, and acrylonitrile to form polymers which are useful as molding materials, reinforcing plastics, and surface coatings. Stilbene derivatives are also widely used in the textile industries as optical brighteners and dyes. In addition, the pharmaceutical industry employs 4,4′-dihydroxy-stilbene and its derivatives as synthetic estrogens.

DESCRIPTION OF THE PREFERRED EMBODIMENTS (1) Starting materials

The compounds useful as starting materials in this invention are substituted aromatic and heterocyclic compounds where at least one of the substituents is a methyl group. Various other substituents besides a methyl group may be attached to the aromatic ring as becomes apparent from the following general Formula 1 for the starting materials of this invention:

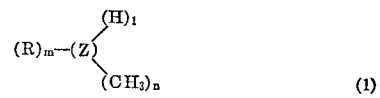

where Z may be

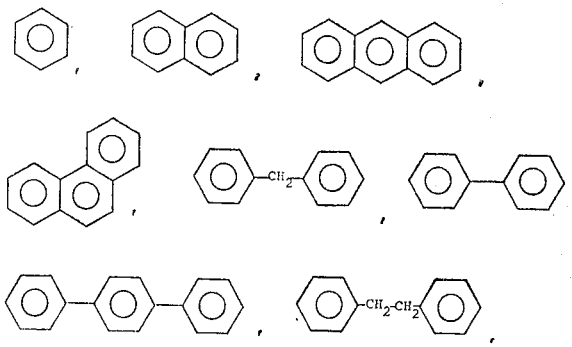

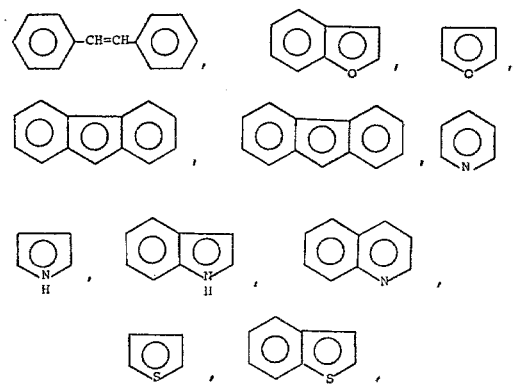

and the like, and R includes alkyl (other than methyl), alkenyl, alkynyl, alicyclic, aryl, halogen, cyano, carboxyl, carbalkoxy, alkoxy, hydroxy, amino, nitro, and acyl groups; $m$ is an integer, ranging from zero to five, more preferably from zero to three, and most preferably from zero to one; $n$ is an integer ranging from one to ten, more preferably from one to three and most preferably from one to two; $l$ is an integer, such that the total of $l$ plus $n$ plus $m$ is equal to the number of substitutable positions on the aromatic nuclei, Z.

Specific examples of compounds defined above include: toluene; ortho-, meta-, and para-xylene; ortho-, meta-, and para-chlorotoluene; ortho-, meta-, and para-bromotoluene; ortho-, meta-, and para-ethyltoluene; 1-chloro-3-ethyltoluene; ortho-, meta-, and para-cyanotoluene (tolunitrile); ortho-, meta-, and para-methyltoluate; ortho-, meta-, and para-methylstyrene; p-cyclohexyltoluene, mesitylene, pseudocumene, p-acetyltoluene, 2,6-dimethylnaphthalene, 1,4 - dimethylanthracene, p-chlorophenyl-toluene, 4,4'-dimethylstilbene, 4-methyl - 4 - ethylstilbene, p-nitrotoluene, and the like. This list is merely illustrative of the wide variety of starting materials that may be used so long as the substituents are non-interfering with respect to the oxidative coupling reaction. The preferred starting materials are toluene and para-substituted toluenes, such as para-xylene, para-halotoluenes, para-acyltoluenes, methyl p-toluate, and para-cyanotoluene (para-tolunitrile).

Mixtures of compounds of the general Formula 1 may also be oxidatively coupled and dehydrogenated to give unsymmetrical ethanes and ethylenes. For example, para-chlorotoluene can be reacted with toluene to give a mixture of 4-chlorobibenzyl and 4-chlorostilbene. In like manner, aromatic-rich petroleum fractions, such as mixed xylenes, may be oxidatively coupled and dehydrogenated to give a mixture of methyl-substituted bibenzyls and stilbenes.

(2) Promoters

To promote the oxidative coupling and dehydrogenation of the methyl-substituted aromatic and heterocyclic compounds, it is preferable to introduce iodine along with the organic feed. The iodine is preferably introduced in the molecular form as a gas; however, it may also be introduced as hydriodic acid. The amount of iodine employed should be from 0.001 to about 0.1 mole per mole of methyl-substituted aromatic or heterocyclic compound, and most preferably from 0.001 to 0.05 mole of iodine per mole of methyl-substituted aromatic or heterocyclic compound.

(3) Oxidizing agent

Oxygen, the preferred oxidizing agent, may be introduced to the reactor as pure oxygen, or as oxygen diluted with other gases such as helium, nitrogen, carbon monoxide, carbon dioxide, or as air. The molar ratio of oxygen to the methyl-substituted aromatic or heterocyclic compound should be from 0.01 to 3.0 or greater and most preferably between 0.05 to about 0.5. It is also preferable to form a reaction mixture of the oxygen or oxygen-containing gas, the methyl-substituted aromatic or heterocyclic compound, and iodine prior to introducing the reactant into the reactor.

(4) Reactors

The reactors useful in the practice of this invention are constructed or lined with titanium, tantalum, nickel, or alloys containing one or more of these metals. Examples of useful alloys of nickel include the strainless steels, the Hastealloys, the Inconels and the Incoloys. The reactor shape is not of importance although tubes are most convenient. The upper portion of the reactor is packed with an inert substance such as ceramic beads, mullite spheres, carborundum chips, glass beads, vermiculite, or naturally occurring granular rocks over which the reaction mixture is passed prior to entering the catalyst section of the reactor, thus providing a two-stage reactor. The improved yields obtainable with said two-stage operation, particularly when iodine is used as the promoter, are illustrated in the examples appended to this case, as well as those of our copending case, Ser. No. 722,170. Alternatively, the reactants may be preheated in tubes, pipes, etc. made of the above mentioned alloys or other materials which are substantially inert, such as clays, mullite, or other ceramic compositions. The ratio of the volume of inert to the volume of catalyst can be varied to suit the particular feed and conditions employed. In general, the inert zone volume will be preferably 0.2 to 20, more preferably 0.4 to 5, and most preferably 0.6 to 2 times the volume of the catalyst zone.

(5) Catalysts

The preferred catalysts for use in our invention are chromites of the general formula:

$$(M^1)_j(Cr_2O_4)_k$$

where $i$ is the valence state of metal M and $j$, and $k$ are integers such that $$j = 2k/i$$

and M is preferably an element from Groups IIa, IVa, Va, or Ib through VIIb and VIII of the Periodic Table. Rare earth element chromites are also excellent catalysts. Mixtures of several chromites are also acceptable catalysts, as well as chromites containing lesser amounts of oxides, hydroxides, or salts of the elements of Group 1a of the Periodic Table.

The preferred catalyst for use in our invention is a copper chromite composition. Such catalysts may be obtained commercially or may be prepared by one skilled in the art. Commercially available catalysts such as Girdler's G–22 and T–531, or Harshaw's Cu–1800 and Cu–1106 are suitable. Alternatively, the copper chromite catalysts may be prepared by thermally decomposing copper chromate, or by other methods employed by those skilled in the art. A review of the various routes to chromites may be found in the following references: Chromium, M. J. Udy, Reinhold Publishing Co., New York, 1956 and Reactions of Organic Compounds Over Copper-Chromium Oxide and Nickel Catalysts, Homer Adkins, University of Wisconsin Press, 1937. The chromite catalysts may be tableted for use in fixed bed reactors or may be pulverized and sized for use in fluidized bed reactors. The tableted catalysts may contain binders such as sodium silicate, or may be supported on carriers such as Kieselguhr, alumina or pumice. The surface areas of the catalysts range between 0.1 and 300 square meters per gram.

(6) Temperature

The reaction is effected by passing the reaction mixture, i.e., the methyl-substituted aromatic or heterocyclic compound, oxygen, and iodine, first through the section of the reactor containing the inert substance or void space at temperatures ranging from 300° to 1300° F., but preferably between 600° and 1200° F., and then through the section of the reactor containing the chromite catalyst at temperatures ranging from 300° to 130° F., but preferably between 600° and 1200° F. Most preferably, the two sections of the reactor are operated between 850° and 1150° F. It is not necessary to operate both sections at the same temperature and in certain instances, improved yields are obtained when operating the two sections of the reactor at different temperatures.

(7) Pressures

The reaction may be effected at pressures ranging from 0.01 to 100 atmospheres, but preferably, between 0.1 and 5 atmospheres, and most preferably at about 0.8 to about 1.2 atmospheres.

(8) Flow rates

The flow rates of the reactants may be varied widely but, preferably, the flow rates of the methyl-substituted aromatic and heterocyclic compounds should range from about 0.01 to about 10 liquid volumes per volume of reactor per hour and most preferably, between about 0.10 to 1.0 liquid volumes of organic compound per volume of reactor per hour. Space velocities may also be calculated in terms of gaseous hourly space velocity, abbreviated GHSV, which is defined as the volumes of reactant vapor, calculated under standard conditions (STP), passed per hour per unit volume of the reaction zone. Inert gases, such as nitrogen and helium are considered as part of the reactant vapor. Gaseous hourly space velocities between about 5 and 1500 hr.$^{-1}$ may be employed for the oxidative coupling-dehydrogenation reaction, but preferably, between 10 and 1000 hr.$^{-1}$, and most preferably between 100 and 600 hrs.$^{-1}$ are used.

(9) Modifications

As a particular illustration of a useful modification of our invention, benzene and styrene are obtained from toluene by the following three-step process: (1) Toluene is oxidatively coupled and dehydrogenated to give a mixture of bibenzyl and stilbene by the process of the present invention. (2) The mixture is then catalytically hydrogenated to convert the stilbene to bibenzyl using methods known to the art. Useful catalysts for the hydrogenation are Raney nickel, Raney copper, platinum oxide, palladium oxide, ruthenium oxide, nickel oxide, copper chromite and the like. The hydrogenation may be carried out in the vapor or liquid phase at hydrogen pressures ranging from five to 10,000, more preferably from 100 to 1,000 p.s.i.g. and at temperatures ranging from 75° to 1000° F., more preferably from 100° to 750° F. Solvents, such as acetic acid, ethanol, aromatics, or the unreacted toluene from the oxidative coupling-dehydrogenation reaction, may be employed to facilitate the reaction. Examples of techniques and conditions for the hydrogenation step can be found in one or more of the following texts and the references contained therein:

Catalytic Hydrogenation. By R. L. Augustine, Marcel Dekker, Inc., New York, 1965;
Hydrogenation of Organic Substances. By Carleton Ellis, D. Van Nostrand Co., Inc., New York, N.Y., 3rd ed., 1930;
Catalytic Hydrogenation Over Platinum Metals. By Paul Nels Rylander, Academic Press, New York, 1967;
Reactions of Organic Compounds Over Copper-Chromium Oxide and Nickel Catalysts. By Homer Adkins, Univ. of Wisconsin Press, 1937.

The solvent and conditions are carefully selected with each particular catalyst to minimize the hydrogenolysis of bibenzyl to toluene. Alternatively, the hydrogenation step may be omitted and a separation step used in its place. Thus, if stilbene is a desired product, the toluene-bibenzyl-stilbene mixture can be separated by distillation or crystallization or a combination of the two. The bibenzyl so obtained is used in step (3). (3) bibenzyl is then thermally catalytically cracked to give benzene and styrene.

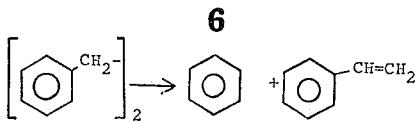

Catalysts useful for the cracking step are acid-treated clays, synthetic zeolites, fajusites (a molecular sieve), alumina, silica-alumina, and the like. U.S. 3,062,903 to Odioso describes the cracking of bibenzyl to benzene and styrene.

This three-step method provides an excellent means for producing benzene and styrene, both valuable chemical intermediates, from the relatively inexpensive toluene. Heretofore, styrene has been prepared by dehydrogenating ethylbenzene. In this conventional, prior-art process, the reactor effluent of the dehydrogenation step contains about 40% styrene and about 60% unreacted ethylbenzene. Because of the close proximity of the boiling points, the separation of reactants and the products requires a series of tedious vacuum distillations. This difficulty is overcome by using the method of this invention since bibenzyl, benzene, and styrene are easily separated by fractionation due to widely differing boiling points.

In another useful modification of this invention, toluene or a substituted toluene is converted into phenanthrene or a phenanthrene derivative. The following two-step process using p-xylene is illustrative of this modification: (1) Para-xylene is oxidatively coupled and dehydrogenated to give a mixture of 4,4'-dimethylbenzyl and 4,4'-dimethylstilbene. (2) The mixture is then catalytically dehydrocyclized to give a mixture of 3,6-dimethyl-9,10-dihydrophenanthrene and 3,6-dimethylphenanthrene. The dehydrocylization is carried out over catalysts such as chromia or alumina, potassium-promoted chromia on alumina, or supported platinum, palladium, or nickel catalysts, said dehydrocyclization being effected at temperatures ranging from 500° to 1500° F., preferably between 800° and 1200° F. and most preferably between 900° and 1100° F. Liquid hourly space velocities ranging from 0.01 to 100 hr.$^{-1}$ may be employed for the dehydrocyclization reaction, but preferably range between 0.05 and 20 hrs.$^{-1}$, and most preferably lie between 0.1 and 10 hr.$^{-1}$. Alternatively, 4,4'-dimethylbibenzyl and 4,4'-dimethylstilbene may be separated prior to the second step of the process and either or both dehydrocyclized separately to give phenanthrene derivatives. Pressure is not narrowly critical and may range from preferably less than atmospheric to 10,000 p.s.i.g. or more, more preferably from about atmospheric to 1,000 p.s.i.g., with about atmospheric pressure most preferred.

Phenanthrene and its derivatives, which form the nucleus of many dyes and other chemical intermediates, are normally isolated from coal tar fractions which are not plenteous in the United States. As a result, much of the phenanthrene used domestically is imported from Europe. Our process provides a simple and economical route for converting readily available and relatively inexpensive toluene to phenanthrene or phenanthrene derivatives. In addition, it allows for the preparation of phenanthrene derivatives with known substitution patterns. For example, when either 4,4'-dimethylbibenzyl or 4,4' - dimethylstilbene is dehydrocyclized, the methyl groups are necessarily in the 3 and 6 positions of the phenanthrene nucleus. This is of great utility in the preparation of phenanthrene derivatives of known structures because substitution reactions are not highly selective. For example, sulfonation of phenanthrene at 60° F. results in a mixture of 2,6-, 2,7-, 2,8-, 3,6-, and 3,8-disulfonic acids. Bromination, nitration, etc., also lead to mixtures of disubstituted products.

In another useful modification of this invention, benzene and ethylbenzene are prepared from toluene by the following two-step process: (1) Toluene is oxidatively coupled and dehydrogenated to give a mixture of bibenzyl and stilbene by the process of this invention. (2) The mixture is then hydrogenated and hydrocracked by passing it over catalysts such as chromia on alumina, palladium on alumina, or platinum on alumina, or other proprietary hydrocracking catalysts licensed by various oil and chemical companies, under hydrogen pressures of 50 to 10,000 p.s.i.g. but preferably between 200 and 2000 p.s.i.g. and most preferably between 300–1200 p.s.i.g. and at temperatures ranging from 100° to 1200° F. but preferably between 200° and 1000° F. and most preferably between 500° and 900° F. and at liquid hourly space velocities ranging between 0.01 to 100 hr.$^{-1}$, but preferably between 0.05 and 20 hr.$^{-1}$ and most preferably between 0.1 and 10 hr.$^{-1}$. The method of U.S. 3,373,217 to Engelbrecht, et al., is of general interest in regard to the second step of the disclosed modification. Alternatively, if either bibenzyl or stilbene is a desired product, the mixture may be separated by conventional means, such as distillation or recrystallization, and the less desirable component hydrocracked to benzene and ethylbenzene. This process provides an inexpensive route to benzene (precursor to ethylbenzene) and ethylbenzene (precursor to styrene) from relatively inexpensive toluene.

The modifications are disclosed as specific embodiments, although a variety of other starting materials, catalysts and operating conditions, e.g. different temperatures, pressures, may be used to obtain similar results, as would become apparent to one skilled in the art upon a reading of this specification. It should be understood that a variety of other modifications and variations are within the scope of this invention and are to be included within the spirit of our invention and the claims appended hereto.

The following examples are illustrative of preferred embodiments of the invention but are not meant to limit it in any way.

(10) Examples

The examples are carried out in stainless steel, Hastelloy, or nickel, tubular reactors, one inch in diameter and twenty-six inches long having a 0.25 inch internal thermowell extending the length of the reactor. The reactor is heated in a furnace and the temperature controlled and recorded from thermocouples located inside the thermowell. The lower-half of the reactor is filled with a tableted chromite catalyst and the upper-half with a substantially inert material such as ceramic, glass beads, mullite spheres, crushed rocks, etc.

The substance to be oxidatively coupled and dehydrogenated is fed to a T by means of a calibrated metering pump where it is mixed with air or oxygen (apportioned through a calibrated rotameter). The halogen promoter is either dissolved in the organic compound to be reacted or metered separately to the mixing T. The resulting reaction mixture is then passed through the reactor. Flow rates are calculated in terms of gaseous hourly space velocity (GHSV). All liquids charged to the reactor are assumed to be ideal gases at STP.

The reactor effluent is passed first into a large flask (2–5 liters), and then through a series of water-cooled condensers, and finally through a Dry-Ice trap. Most of the products, i.e., stilbenes, bibenzyls, as well as unreacted starting material, condense in the large flask; the remainder are removed in the series of condensers and traps. It is sometimes necessary to supply a glass wool plug to filter out the solids prior to entering the condensing system.

The products are separated and analyzed by chromatographic techniques. The structures of the products are verified by ultraviolet, infrared, and nuclear magnetic resonance spectroscopy, elemental analysis, and physical properties.

The conversions, yields, selectivities, are calculated on the amount of condensable product after suitable analysis in the following manner:

Conversion (Percent)
$$= \frac{100 \text{ (moles starting material reacted)}}{\text{(moles starting material)}}$$

$$\text{Yield (Percent)} = \frac{100 \text{ (moles product)}}{\text{(moles starting material)}}$$

$$\text{Selectivity} = \frac{\text{yield}}{\text{conversion}}$$

The following examples employ the above-mentioned procedures. The ratios of oxygen to starting material are molar ratios. Percents are by weight.

(A) OXIDATIVE COUPLING AND DEHYDROGENATION WITH TWO-STAGE PROCESS

Example 1

Toluene, containing two percent iodine, is oxidatively coupled and dehydrogenated under the following conditions:

Temperature:
  Inert section—1200° F.
  Catalyst section—1000° F.
GHSV—286 hr.$^{-1}$
$O_2$/toluene—0.25
Catalyst:
  30% copper chromite
  10% potassium oxide The conversion, yield, and selectivity to a mixture of bibenzyl and stilbene are 24.4%, 23.0%, and 0.959, respectively.

Example 2

Toluene, containing two percent iodine, is oxidatively coupled and dehydrogenated under the following conditions:

Temperature:
  Inert section—1000° F
  Catalyst section—1000° F.
GHSV—241 hr.$^{-1}$
Catalyst:
  15% copper chromite
  10% potassium oxide The conversion, yield, and selectivity to a mixture of bibenzyl and stilbene are 16.3%, 14.5%, and 0.890, respectively.

Example 3

Para-xylene, containing one percent iodine, is oxidatively coupled and dehydrogenated under the following conditions.

Temperature:
  Inert section—1050° F.
  Catalyst section—1050° F.
GHSV—500 hr.$^{-1}$
$O_2$/p-xylene—0.25
Catalyst:
  15% copper chromite
  15% nickel chromite The conversion, yield, and selectivity to a mixture of 4,4'-dimethylbibenzyl, 4,4'-dimethylstilbene, and 4,4'-bis(p-methylstyryl)-p-phenylene are 17.0%, 11.3%, and 0.668, respectively.

Example 4

Para-chlorotoluene, containing one percent iodine, is oxidatively coupled and dehydrogenated under the following conditions:

Temperature:
  Inert section—1000° F.
  Catalyst section—1000° F.
GHSV—400 hr.$^{-1}$
$O_2$/p-chlorotoluene—0.25

Catalyst:
   15% copper chromite
   15% nickel chromite

The conversion, yield, and selectivity to a mixture of 4,4'-dichlorobibenzyl and 4,4'-dichlorostilbene are 13.6%, 8.3%, and 0.610, respectively.

Example 5

Para-tolunitrile, containing one percent iodine, is oxidatively coupled and dehydrogenated under the following conditions:

Temperature:
   Inert section—1000° F.
   Catalyst section—1000° F.
GHSV—400 hr.$^{-1}$
O$_2$/p-tolunitrile—0.25
Catalyst—30% copper chromite The conversion, yield, and selectivity to a mixture of 4,4'-dicyanobibenzyl and 4,4'-dicyanostilbene are 13.6%, 10.4%, and 0.765, respectively.

Example 6

Meta-xylene, containing one percent iodine, is oxidatively coupled and dehydrogenated under the following conditions:

Temperature:
   Inert section—1050° F.
   Catalyst section—1050° F.
GHSV—250 hr.$^{-1}$
O$_2$/m-xylene—0.25
Catalyst:
   15% copper chromite
   15% barium chromite The conversion, yield, and selectivity to a mixture of 3,3'-dimethylstilbene and 3,3'-bibenzyl are 12.0%, 9.4%, and 0.774, respectively.

Example 7

4'-methylacetophenone, containing one percent iodine, is oxidatively coupled and dehydrogenated under the following conditions:

Temperature:
   Inert section—1050° F.
   Catalyst section—1050° F.
GHSV—300 hr.$^{-1}$
O$_2$/4'-methylacetophenone—0.25
Catalyst—30% copper chromite The conversion, yield, and selectivity to a mixture of 4,4'-diacetylbibenzyl and 4,4'-diacetylstilbene are 17.4%, 7.9%, and 0.454, respectively.

Example 8

1-methylnaphthalene, containing one percent iodine, is oxidatively coupled and dehydrogenated under the following conditions:

Temperature:
   Inert section—1050° F.
   Catalyst section—1050° F.
GHSV—300 hr.$^{-1}$
O$_2$/1-methylnaphthalene—0.25
Catalyst—30% copper chromite The conversion, yield, and selectivity to a mixture of 4,4'-bis(1-naphthyl)-ethane and 4,4'-bis(1-naphthyl)ethylene are 17.3%, 4.6%, and 0.266, respectively.

Example 9

Methyl p-toluate, containing one percent iodine, is oxidatively coupled and dehydrogenated under the following conditions:

Temperature:
   Inert section—1000° F.
   Catalyst section—1000° F.
GHSV—300 hr.$^{-1}$
O$_2$/methyl p-toluate—0.22
Catalyst—30% copper chromite The conversion, yield, and selectivity to a mixture of 4,4'-bis(carbmethoxy)bibenzyl and 4,4'-bis(carbmethoxy)stilbene are 10.1%, 7.2% and 0.704, respectively.

Example 10

Para-methylanisole, containing one percent iodine, is oxidatively coupled and dehydrogenated under the following conditions:

Temperature:
   Inert section—1000° F.
   Catalyst section—1000° F.
GHSV—300 hr.$^{-1}$
O$_2$/p-methylanisole—0.21
Catalyst—30% copper chromite The conversion, yield, and selectivity to a mixture of 4,4'-dimethoxybibenzyl and 4,4'-dimethoxystilbene are 9.1%, 6.1% and 0.670, respectively.

(B) OXIDATIVE COUPLING AND DEHYDROGENATION WITH ONE STEP PROCESS

Example 11

The experiment described in Example 1 is repeated, except that the reactor was filled entirely with ceramic beads (no catalyst) instead of being half-filled with ceramic beads and half-filled with copper chromite and potassium oxide catalyst. The yield to stilbene and bibenzyl is 11.8%, rather than 23.0%, as in Example 1.

Example 12

The experiment described in Example 1 is again repeated, except that the reactor is completely filled with the catalyst, rather than being half-filled with ceramic beads and copper chromite-potassium oxide catalyst. The yield of bibenzyl and stilbene is 1.2%, rather than 23.0%, as in Example 1.

(C) PREPARATION OF BENZENE AND STYRENE

Example 13

The product mixture from Example 1, using the unreacted toluene as solvent was hydrogenated in an autoclave at 200–250° F. and 250 p.s.i.g. hydrogen over a Raney nickel catalyst thereby converting the stilbene to bibenzyl. The toluene-bibenzyl mixture was then catalytically cracked to benzene and styrene by passing it over Filtrol TCC catalyst at 1000° F. and about one atmosphere at a liquid hourly space velocity of 0.9 hr.$^1$ Example 14

The product mixture from Example 1, using the unreacted toluene as solvent, was hydrogenated in an autoclave at 200° F. and 150 p.s.i.g. hydrogen over a platinum on carbon catalyst thereby converting the stilbene to bibenzyl. The toluene-bibenzyl mixture was then catalytically cracked to benzene and styrene by passing it over Davidson's XY-15 catalyst at 950° F. and about one atmosphere at a liquid hourly space velocity of 0.75 hr.$^{-1}$.

(D) PREPARATION OF PHENANTHRENE

Example 15

The product from Example 1, using the unreacted toluene as solvent, was dehydrocyclized to a mixture of 9,10-dihydrophenanthrene and phenanthrene over Harshaw's Cr-0101, chromia-alumina catalyst, at 950° F. and about one atmosphere at a liquid hourly space velocity of 0.95 hr.$^{-1}$.

Example 16

The product from Example 3, using the unreacted p-xylene as solvent, was dehydrocyclized to a mixture of 3,6-dimethyl-9,10-dihydrophenanthrene and 3,6-dimethylphenanthrene over Harshaw's Cr–0105, chroma-alumina catalyst at 1000° F. and about one atmosphere at a liquid hourly space velocity of 0.89 hr.$^{-1}$.

(E) PREPARATION OF BENZENE AND ETHYLBENZENE

Example 17

The product mixture from Example 1, using the unreacted toluene as solvent, was hydrocracked to a mixture of benzene and ethylbenzene over a chromium oxide on alumina catalyst at 950° F. and 700 p.s.i.g. hydrogen at a liquid hourly space velocity of 1.07 hr.$^{-1}$.

Example 18

The product mixture from Example 1 was recrystallized from toluene to isolate the stilbene. The stilbene was then dissolved in mixed xylenes and hydrocracked to a mixture of benzene and ethylbenzene over a palladium exchanged zeolite catalyst at 1000° F. and 1000 p.s.i.g. hydrogen at a liquid hourly space velocity of 0.87 hr.$^{-1}$.

What is claimed is:

1. A process for both oxidatively coupling and dehydrogenating substituted aromatic compounds wherein at least one of the substituents is a methyl group, said process being conducted in the vapor phase by forming a reaction mixture of methyl-substituted aromatic compounds, iodine, and oxygen-containing gas, passing said reaction mixture through a reactor containing two zones, the first consisting either substantally free space or containing a substance substantially inert to reaction with iodine, and the second zone containing a chromite of a metal selected from Groups IIa, IVa, Va, Ib through VIIb, and VIII of the Periodic Table of the Elements, said reaction mixture being passed first through said first zone, and then through said catalyst zone, at temperatures between about 300° and about 1300° F. and at gas hourly space velocities between 5 and 1500 hr.$^{-1}$, wherein for every mole of methyl-substituted aromatic compound there is from 0.001 to about 0.1 mole of iodine; wherein the reaction is carried out at pressures ranging from about 0.1 to about 10 atmospheres; and wherein for every mole of methyl-substituted aromatic or heterocyclic compound there is from 0.01 to about 3.0 moles of oxygen.

2. A process according to claim 1 wherein at least one of said zones contains elemental metal comprising a metal selected from the group consisting of: titanium, tantalum, nickel, or alloys thereof.

3. The process of claim 1 wherein the catalyst additionally comprises oxides, hydroxides, or salts of the elements from group Ia of the Periodic Table of the Elements.

4. The process of claim 1 wherein the catalyst is copper chromite.

5. The process of claim 1 wherein the catalyst is a mixture of barium chromite and copper chromite.

6. The process of claim 1 wherein the catalyst is a mixture of nickel chromite and copper chromite.

7. The process of claim 1 wherein the catalyst is a mixture of iron chromite and copper chromite.

8. The process of claim 1 wherein the catalyst is iron chromite.

9. The process of claim 1 wherein the catalyst is zinc chromite.

10. The process of claim 1 wherein the catalyst is copper chromite and potassium carbonate.

11. The process of claim 1 wherein the reaction mixture is passed through said first zone of the reactor at temperatures from about 600° to about 1200° F.

12. A process according to claim 11 wherein at least one of said zones contains elemental metal comprising a metal selected from the group consisting of: titanium, tantalum, nickel, or alloys thereof.

13. The process of claim 1 wherein the reaction mixture is passed through said second section of the reactor, at temperatures from about 600° to about 1200° F.

14. A process according to claim 13 wherein at least one of said zones contains elemental metal comprising a metal selected from the group consisting of: titanium, tantalum, nickel, or alloys thereof.

15. The process of claim 1 wherein the reaction mixture is passed through the reactor at gaseous hourly space velocities of 5 to 1500 hr. $^{-1}$.

16. The process of claim 1 wherein the inert section of the reactor is filled with clay or ceramic compositions.

17. The process of claim 1 wherein the inert material is mullite.

18. The process of claim 1 wherein the inert material is carborundum.

19. The process of claim 1 wherein the inert material is granular rock.

20. The process of claim 1 wherein the reactor is fabricated or lined with a member selected from the group consisting of Hastelloy, stainless steel, Inconel, Incoloy, or mixtures thereof.

21. The process of claim 1 wherein the methyl-substituted aromatic compound is toluene and the products are primarily bibenzyl and stilbene.

22. A process according to claim 21 wherein at least one of said zones contains elemental metal comprising a metal selected from the group consisting of: titanium, tantalum, nickel, or alloys thereof.

23. The process of claim 1 wherein the methyl-substituted aromatic compound is p-xylene and the primary products are 4,4'-dimethylbibenzyl, 4,4'-dimethyl stilbene, and bis(p-methylstyryl)-p-phenylene.

24. The process of claim 1 wherein the methyl-substiustuted aromatic compound is p-chlorotoluene and the primary products are 4,4'-dichlorobibenzyl and 4,4'-dichlorostilbene.

25. The process of claim 1 wherein the methyl-substituted aromatic compound is p-bromotoluene and the primary products are 4,4'-dibromobibenzyl and 4,4'-dibromostilbene.

26. The process of claim 1 wherein the methyl-substituted aromatic compound is 4'-methlyacetophenone and the primary products are 4,4'-diacetylbibenzyl and 4,4'-diacetylstilbene.

27. The process of claim 1 wherein the methyl-substituted aromatic compound is is p-tolunitrile and the primary products are 4,4'-dicyanobibenzyl and 4,4'-dicyanostilbene.

28. The process of claim 1 wherein the methyl-substituted aromatic compound is methyl p-toluate and the primary products are 4,4'-bis(carbmethoxy)bibenzyl and 4,4'-bis(carbmethoxy)stilbene.

29. The process of claim 1 wherein the methyl-substituted heterocyclic compound is 4-methylpyridine and the products are 1,2-bis(4 - pyridyl)ethane and 1,2-bis-(4-pyridyl)ethylene.

30. A process according to claim 1 for the preparation of a mixture of benzene and ethylbenzene from toluene comprising in combination the following steps: (1) preparing a mixture of bibenzyl and stilbene from toluene by the process of claim 1; (2) contacting the mixture with a hydrocracking catalyst at temperatures ranging from 100° to about 1200° F. and at hydrogen pressures from about 50 to about 10,000 p.s.i.g. to produce a mixture of benzene and ethylbenzene.

31. A process according to claim 1 for the preparation of a mixture of benzene and styrene from toluene comprising in combination the following steps: (1) preparing a mixture of bibenzyl and stilbene from toluene by the process of claim 1; (2) contacting the mixture with a hydrogenation catalyst at hydrogen pressures ranging from about 5 to about 10,000 p.s.i.g. and temperatures ranging from 75° to about 1000° F. to convert the stilbene to bibenzyl; (3) thermally or catalytically cracking the bibenzyl to produce a mixture comprising styrene and benzene.

32. A process according to claim 1 for the preparation of substituted phenanthrenes comprising in combination the following steps: (1) preparing a mixture of substituted bibenzyls and stilbenes from the appropriately substituted toluenes by the process of claim 1; (2) contacting the mixture with a dehydrocyclization catalyst at temperatures ranging from 500° to 1500° F., thereby converting the mixture of substituted bibenzyl and stilbenes to substituted phenanthrenes.

33. The process of claim 32 wherein the methyl-substituted aromatic compound is p-xylene and the product is a mixture of 3,6-dimethyl - 9,10 - dihydrophenanthrene and 3,6-dimethylphenanthrene.

34. A process according to claim 1 for the preparation of a mixture of phenanthrene and 9,10-dihydrophenanthrene comprising in combination the following steps: (1) preparing a mixture of bibenzyl and stilbene from toluene by the process of claim 1; (2) contacting the mixture with a dehydrocyclization catalyst at temperatures ranging from 500° to 1500° F., thereby converting the mixture of bibenzyl and stilbene to a mixture of phenanthrene and 9,10-dihydrophenanthrene.

35. A process for oxidatively coupling and dehydrogenating compounds of the general Formula 1 to compounds of the general Formulae 2 and 3.

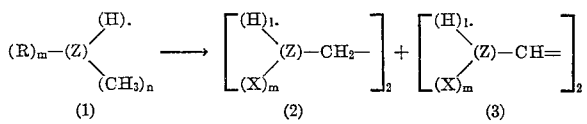

where Z may be

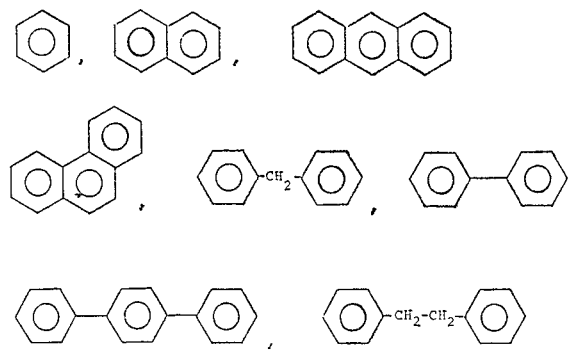

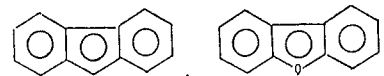

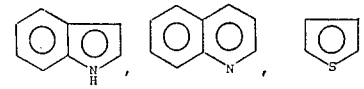

where R includes alkyl (other than methyl), alkenyl, alkynyl, alicyclic, aryl, halogen, cyano, carbalkoxy, alkoxy, and acyl groups; $m$ is an integer ranging from zero to five; $n$ is an integer ranging from one to ten; $l$ is an integer, such that the total of $l$ plus $n$ plus $m$ is equal to the number of substitutable positions on the aromatic nuclei, Z; said process being conducted in the vapor phase by forming a reaction mixture of a compound of the general Formula 1 with oxygen or an oxygen-containing gas and iodine, passing said reaction mixture through a reactor containing two distinct zones, an inert first zone and then through a catalyst zone consisting of a catalyst mass comprising chromite and an elemental titanium, tantalum or nickel, said reaction mixture being passed first through the inert zone and then through the catalyst zone at temperatures of about 300° to 1300° F. and at gaseous hourly space velocities of five to 1500 hr.$^{-1}$.

References Cited

UNITED STATES PATENTS

| | | | |
|---|---|---|---|
| 3,308,191 | 3/1967 | Bajars | 260—680 |
| 3,409,680 | 11/1968 | Hardesty et al. | 260—649 |
| 3,522,323 | 7/1970 | Duke et al. | 260—668 |

HENRY R. JILES, Primary Examiner

G. T. TODD, Assistant Examiner

U.S. Cl. X.R.

260—287 R, 288 R, 294.9, 295 R, 295.5 R, 296 D, 326.14 R, 362.15, 329 HS, 330.5, 332.2 C, 332.3 R, 332.5, 345.7